United States Patent [19]

Okano et al.

[11] Patent Number: 4,561,769
[45] Date of Patent: Dec. 31, 1985

[54] COMBINED CAMERA AND VIEWER

[75] Inventors: Takeshi Okano, Nishinomiya; Shuichi Ohtsuka, Kanagawa, both of Japan

[73] Assignee: Fuji Photo Film Co., Ltd., Kanagawa, Japan

[21] Appl. No.: 652,030

[22] Filed: Sep. 19, 1984

[30] Foreign Application Priority Data

Sep. 19, 1983 [JP] Japan ................................ 58-173870

[51] Int. Cl.$^4$ .............................................. G03B 13/28
[52] U.S. Cl. ........................................ 355/45; 355/40
[58] Field of Search ...................... 355/44, 45, 66, 43, 355/40, 41

[56] References Cited

U.S. PATENT DOCUMENTS 3,873,213 3/1975 Plumadorf .
4,049,346 9/1977 Austin ................................... 355/45
4,286,864 9/1981 Lysle et al. ............................ 355/41
4,461,566 7/1984 Plumadore ............................. 355/45

FOREIGN PATENT DOCUMENTS 56-81843 7/1981 Japan .
58-149572 9/1983 Japan .

OTHER PUBLICATIONS

Image Technology, pp. 38-44, Xerox Dry Microfilm: A Versatile Camera-Film and Information-Recording Medium, P. S. Vincett.

Primary Examiner—Monroe H. Hayes
Attorney, Agent, or Firm—Sughrue, Mion, Zinn, Macpeak & Seas

[57] ABSTRACT

A combined camera and viewer capable of operating selectively under camera and projector modes one at a time, and being, when under the camera mode, operable to expose image information on a photosensitive film having a plurality of frames, and being, when under the projector mode, operable to project onto a screen an image recorded on the photosensitive film, which apparatus comprises a film transporting mechanism for transporting the film to bring any one of the frames to one of exposing and projecting positions, a detector for detecting whether or not such any one of the frames has been brought to such one of the exposing and projecting positions, and a discriminator for discriminating whether or not the image has been recorded on any one of the frames. When the apparatus is under the camera mode and the discriminator determines that the image information has been recorded on any one of the frames, such one frame is inhibited from being brought to the exposing position, and when the apparatus is under the projector mode and the discriminator determines that the image information has not yet been recorded thereon, such one frame is inhibited from being brought to the projecting position.

11 Claims, 13 Drawing Figures

COMBINED CAMERA AND VIEWER

BACKGROUND OF THE INVENTION

The present invention generally relates to a combined camera and viewer for use in connection with photography, and particularly with micro photographic records.

More specifically, the present invention relates to a self-contained apparatus in which micro photographic records of image information can be conveniently formed on a length of strip film and/or micro photographic records formed on a length of strip film can readily and conveniently examined or projected in enlarged image.

The term "image information" employed in the specification and claims is to be understood as including an arrangement of alphanumeric characters with or without pictorial representation, an arrangement of figures, and any other pieces of information reproduced or reproducible by means of a photographic technique.

Hitherto, a microfilm apparatus has been largely employed in practice as an apparatus for recording the image information on a microfilm. The microfilm is provided with either silver halide emulsion or diazo pigment and is generally used in the form of a roll of strip film, a microfiche, or an apertured cards.

On the other hand, an electrophotographic technique has been developed recently and has proved effective to form a high resolution of image on a transparent film. An electrophotographic microfilm system utilizing the electrophotographic technique is disclosed in, for example, Japanese Laid-open Patent Publication No. 58-149572, published Sept. 5, 1983. The electrophotographic system disclosed therein is a self-contained apparatus having four capabilities operable one at a time. These capabilities include a camera capability by which the image information can be photographically exposed on the microfilm, a processor capability by which the microfilm exposed to an image-wise light can be developed and fixed to render the image information so recorded photographically visible to the naked eyes, a reader capability by which the image information developed can be projected on an enlarged scale onto a built-in screen, and an information retrieving capability by which a desired frame of the microfilm can be readily retrieved immediately upon demand. This electrophotographic microfilm system has a number of advantages in that the photographic recording and developing of the image can be sequentially performed in situ, and the projection of the image information on an enlarged scale onto the built-in screen to be viewed by the operator can be carried immediately after the fixing of the microfilm. In addition, not only can the retrieval and projection of the image information recorded on a randomly chosen frame of the microfilm be possible, but also the image information can be photographically recorded on a purposely or purposelessly chosen frame of the microfilm. Moreover, the system is compact in structure as much as it can be placed on the top of an office desk and is, therefore, utilizeable as a data file.

A specific example of the above described microfilm system is shown in FIGS. 1 to 5. The electrophotographic microfilm system has such an outer appearance as shown in FIG. 1 and has a foldable lid 2 which, when the system is in use, is pivoted to an opened position as shown in FIG. 2 to form an optical system utilizeable during the exposure (i.e., photographically recording the image information on the microfilm) and the projection of the image information. The electrophotographic microfilm (hereinafter referred to as "microfilm" for the sake of brevity) is accommodated in a two-reeled cassette 3 such as shown in FIG. 3, said cassette 3 being adapted to be set in a cassette holder 4 shown in FIG. 2. Within the cassette 3, as shown in FIG. 4, a length of magnetic recording tape 6 is connected at one end to a hub 5, and a length of rolled microfilm 8 is connected at one end to another hub 7, the length of magnetic recording tape 6 and the length of rolled microfilm 8 having their respective opposite ends connected together to provide a single length of tape 9. The length of tape 9 has a width of, for example, 16 mm, and has a row of blip markings 10 formed on one of the opposite edge portions thereof in a direction lengthwise of the tape 9. The blip markings 10 are used for the detection of a frame address (it being, however, noted that it may happen that the blip markings is used for the control of a position at which a frame is brought to a halt).

The length of tape 9 is transported by a direct current motor 11 in one of the opposite directions lengthwise thereof as shown in FIG. 5. When the image information is desired to be photographically recorded, an original bearing the image information is placed on a transparent support 12 which concurrently serves as a screen. The original placed on the support 12 is illuminated by an illuminator lamp 13 with an image-wise light being consequently reflected from the original on the support 12. This image-wise light is then projected through spaced reflecting mirrors 14 and 15 and then through a lens assembly 16 onto one of the frames then positioned at a charging and exposure chamber. After the exposure, the length of tape 9 is passed frame by frame through a processing head 17, provided with a developing chamber and a drying chamber, so as to permit the exposed frame or frames to be automatically developed. The processing head employed may be the one disclosed in, for example, application Ser. No. 585,932, filed Mar. 5, 1984, or application Ser. No. 575,522 filed Feb. 9, 1984.

The frame in which the image has been developed is held at a predetermined position (within the charging and exposure chamber) of the processing head 17 and, if it is illuminated by a projector lamp 18 through a mirror 19 and a condenser lens 20, the resultant image-wise light can be projected through the lens assembly 16 and then through the mirrors 15 and 14 onto the combined support and screen 12 with the image consequently reproduced on an enlarged scale.

Information concerning the image electrophotographically recorded in the manner described above is stored, on piecemeal basis, in a storage means 21 which is built in the apparatus and which may comprise a write-in/write-out storage means, for example, a semiconductor memory, and, after the completion of a required processing, is automatically recorded on the length of magnetic recording tape 6 by a magnetic recording head 25 on frame-to-frame basis. During the subsequent use, the contents recorded on the length of magnetic tape 6 are read out by another magnetic head 22 secured to the tip of an arm and are then read in the storage means. Various control functions are executed by an electronic control means (for example, a digital logic circuit or an analog circuit) having a microprocessor or a microcomputer constituting the heart thereof), built in the apparatus, on the basis of the data stored in the storage means 21 and external data and commands, and, on the other hand, operating commands are provided by operating various switches arranged on a control panel 23.

In the combined camera and viewer of the construction described above, since the recording and the projection of the image information can be performed one at a time, at any time and in any manner as desired by the operator, there is the possibilities that an unexposed frame or frames may be exposed to light emitted from the projector lamp and that a once-exposed frame may again be exposed to the image-wise light. In the former case, the electrophotographic film is susceptible to exhaustion due to exposure to light to such an extent as to result in the reduced contrast of an image subsequently photographed, and in the latter case, double exposure takes place with the consequence that the previously photographed image is destroyed.

SUMMARY OF THE INVENTION

Accordingly, the present invention has been developed with a view to substantially eliminating the above described problems inherent in the combined camera and viewer of the construction described above and has for its essential object to provide an improved self-contained apparatus for recording and projecting image information, wherein a discrimination of a photosensitive film is made to determine whether or not one of the frames where image information is desired to be recorded has been occupied, i.e., has been exposed to the image-wise light, and therefore, has born the image information previously recorded thereon, for the purpose of avoiding both the problem associated with the exhaustion and the problem associated with the double exposure.

In order to accomplish this object, according to one aspect, the present invention has been so devised that, when the apparatus is in a camera mode in which image information can be electrophotographically exposed on a photosensitive film, any one of the frames of the photosensitive film which has already been occupied is inhibited from being brought to an exposure position, and when the apparatus is in a projector mode in which the image information recorded on any one of the frames can be projected onto the screen, any one of the frames which has not yet been exposed to the image-wise light is inhibited from being brought to a projecting position.

According to another aspect of the present invention, when any one of the frames is brought to the exposure position, a discrimination is made to determine if any one of the frames has already been occupied by the image information. If any such frame has proved to be occupied, no exposure is effected to such frame, and when any one of the frames is brought to the proecting position and if it has proved not to be occupied, light used to project the image is inhibited from illuminating any such frame.

BRIEF DESCRIPTION OF THE DRAWINGS

This and other objects and features of the present invention will readily become apparent to those skilled in the art from the following description taken in conjunction with preferred embodiments thereof with reference to the accompanying drawings, in which.

DETAILED DESCRIPTION OF THE EMBODIMENTS

Figure 1:
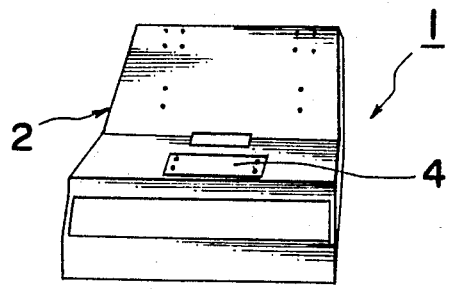
FIG. 1 is a perspective view of a combined camera and viewer providing the background of the present invention.
Figure 2:
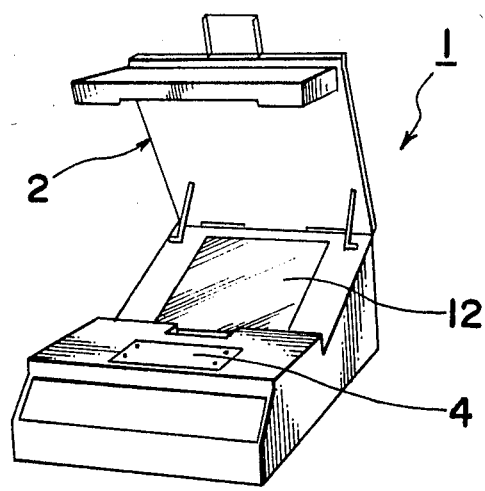
FIG. 2 is a perspective view of the apparatus shown in FIG. 1, with a lid opened.
Figure 3:
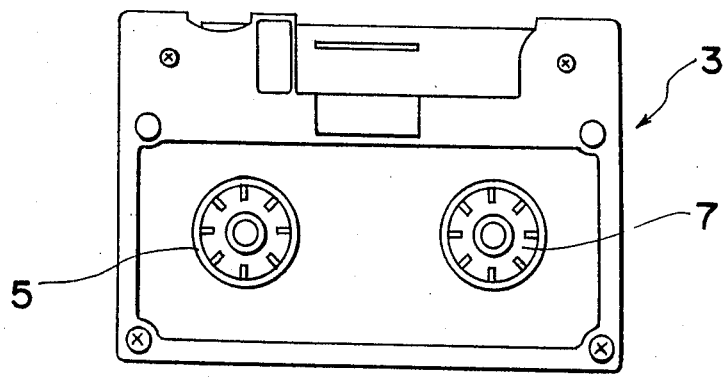
FIG. 3 is a top plan view showing a two-reeled cassette used in the apparatus.
Figure 4:
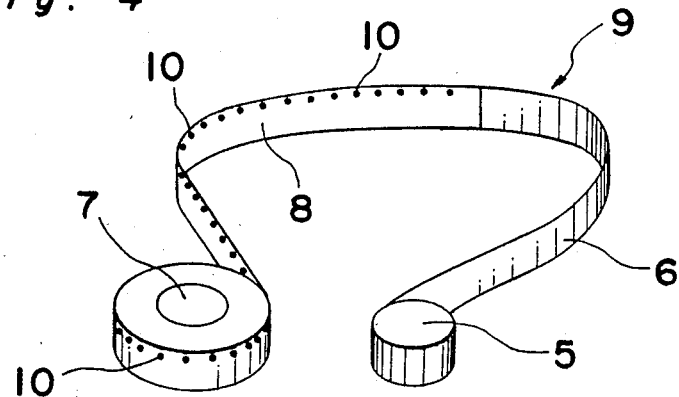
FIG. 4 is a perspective view of a length of tape housed in the cassette.

Before the description of the present invention proceeds, it is to be noted that like parts are designated by like reference numerals throughout the accompanying drawings. It is also to be noted that, although reference is made to an electrographic microfilm as a photosensitive film used in the practice of the present invention, the present invention should not be limited to the use of such electrophotographic microfilm, but any other photosensitive film such as, for example, such a film having an organic silver halide emulsion layer as disclosed in Japanese Laid-open Patent Publication No. 56-81843, or such an electrophotographic migration imaging film as disclosed in Journal of Applied Photographic Engineering, Vol. 9, No. 138 (1983), may be employed.

Figure 5:
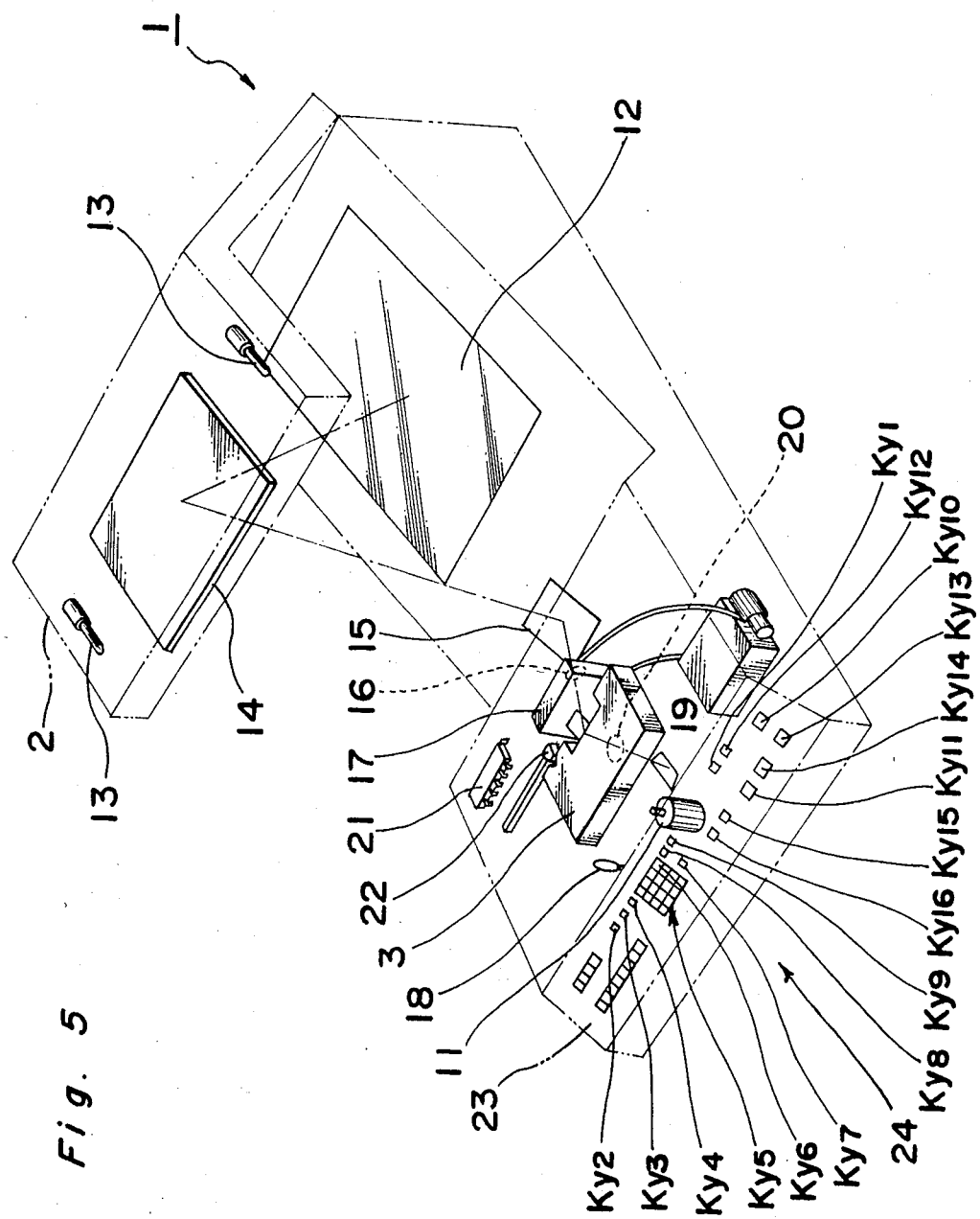
FIG. 5 is a perspective view of the apparatus showing internal mechanisms thereof.
Figure 6:
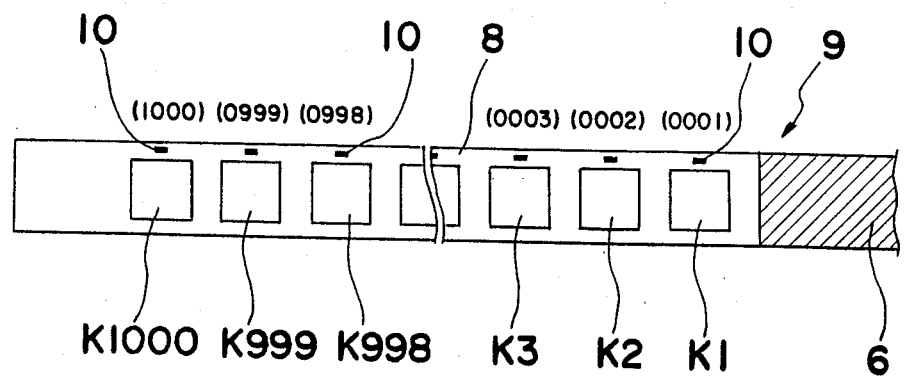
FIG. 6 is a front elevational view of a portion of the length of tape, showing the manner in which frames are assigned memory addresses.
Figure 7:
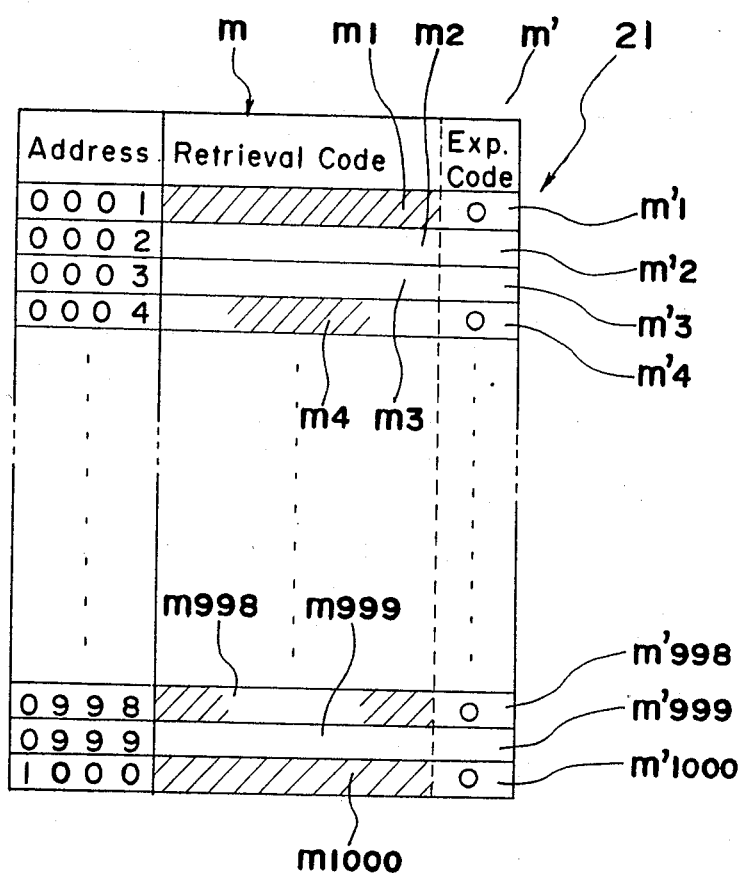
FIG. 7 is a diagram showing a table of address locations of a memory where information of the frames is stored.

Referring first to FIGS. 6 and 7, the relationship between the microfilm and the storage means 21 (FIG. 5) will be discussed. As shown in FIG. 6, the length of microfilm 8 forming the length of tape 9 has one side edge printed with a row of blip markings 10. So far shown, since the length of microfilm 8 is assumed to have 1000 frames K1, K2, . . . K999 and K1000, the number of the blip markings 10 is equal to the number of the frames, and the blip markings 10 so printed are located in alignment with the centers of the respective frames, it being to be noted that the first frame K1 is located adjacent the joint between the length of microfilm 8 and the length of magnetic recording tape 6. These frames K1, K2, . . . K999 and K1000 are respectively allocated addresses (0001), (0002), . . . (0999) and (1000) as shown. In order to bring one of the frames to a predetermined position by transporting the length of microfilm 8 in one of the opposite directions, there is utilized a mark reader for counting the number of the blip markings 10 passed thereacross, which mark reader, although not shown, may be of a type capable of photoelectrically detecting the passage of the blip marking 10 and then generating a train of pulses equal in number to the number of blip markings detected thereby.

FIG. 7 illustrates the relationship between the address locations of the storage means 21 and information concerned with the frames. The storage means 21 is a random access memory (RAM) preferably in the form of a semiconductor IC memory, but any random access memory in the form of a magnetic disc or a magnetic valve memory may also be employed for the storage means 21.

The storage means 21 has memory areas m and m' and is of a type having a storage capacity capable of accommodating at least 1000 frames. The memory area m is utilized to store retrieval codes whereas the memory area m' is utilized to store exposure codes. The memory area m is comprised of a plurality of bits and can have a variety of blocks for the purpose of diversified retrieval. On the contrary thereto, the memory area m' for the storage of the exposure codes is assigned one bit at minimum.

Examples of the codes stored in the memory area m include three types of markings, that is, index marking, C marking, D marking and 8 hexadecimal digits. These three types of markings can be inputed by depressing keys associated respectively therewith, and the 8 hexadecimal digits can be inputed by depressing numerical keys successively. Where no code input is necessary, no input will be entered if no keys are depressed in case of the three types of markings and if a "NON" key is depressed in case of the eight hexadecimal digits. Since if a clear key is depressed, the code can be cleared, the code setting can be repeated. In addition, the date can also be set if desired. Where the apparatus has an autocalendar, the date can be automatically inputed merely by manipulating a single calendar key, with no need to input it manually. In other words, when the calendar key is depressed, the data can be set in the five bits in the memory area for the eight hexadecimal digits. These can be utilized when the retrieval is desired to be performed with reference to the date.

Figure 8:
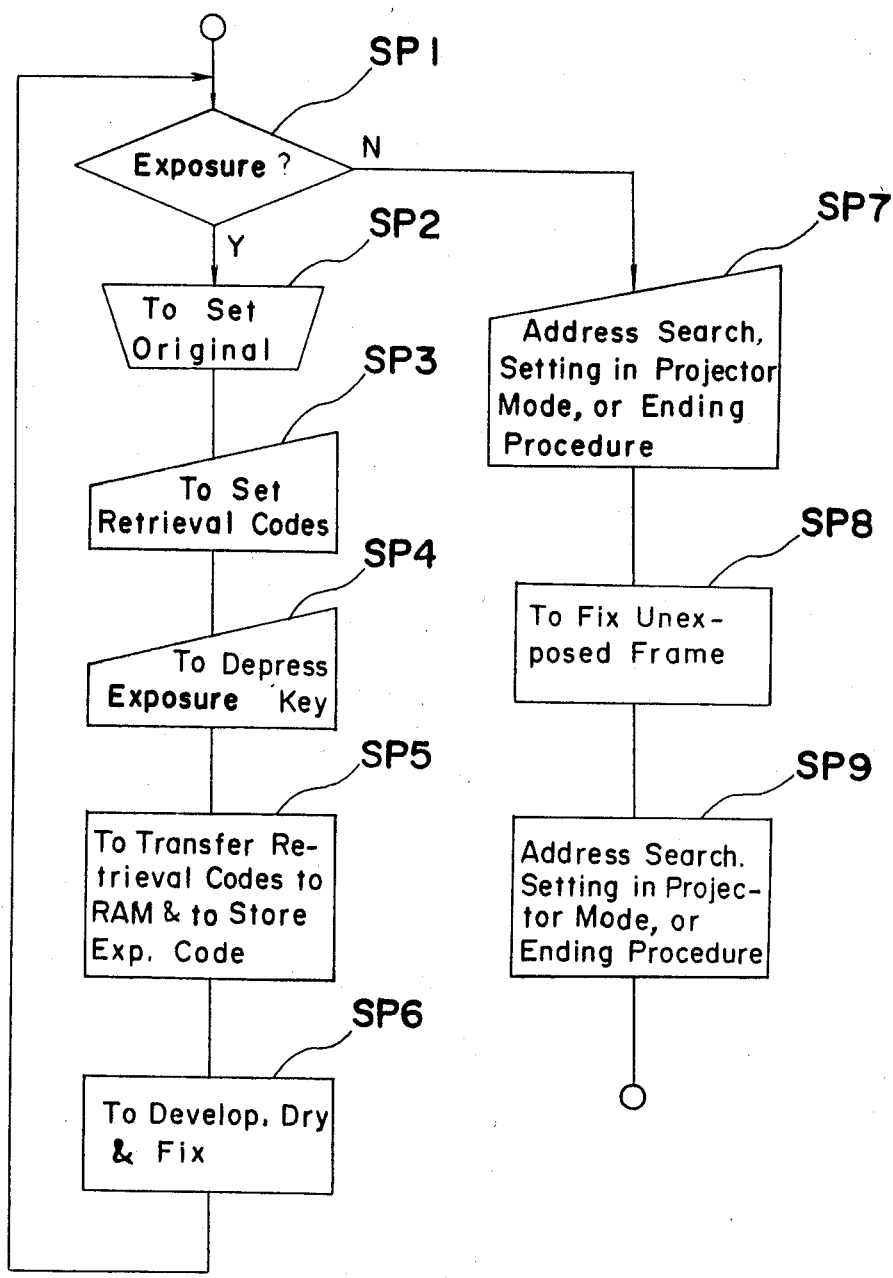
FIG. 8 is a flow chart showing the sequence of operation of the apparatus in a camera mode.

These retrieval codes are set prior to the exposure. As can be understood from the flow chart of FIG. 8 showing the sequence under a camera mode, and as has been described with reference to FIG. 5, the step SP1 takes place when a camera mode key Ky1 is depressed. At this step SP1, the operator should make a decision as to whether the actual exposure should be executed, whether the film should be fed, or whether a projector mode should be established, and should then go through a necessary key manipulation. Where the actual exposure should be executed, an original bearing an image to be recorded is placed on the combined screen and support 12 at the step SP2. At the subsequent step SP3, the retrieval codes (including a calendar code) are set (inputed). The index marking can be inputed by depressing an index key Ky2, and the C marking and the D marking can be inputed by depressing keys Ky3 and Ky4, respectively. A numerical code can be inputed by depressing one of the numerical keys Ky5. Where no numerical key is needed, a NON key Ky6 has to be depressed. Where the date is to be inputed, a calendar key Ky7 is to be depressed. A clear key Ky8 is used when the input of any one of the codes is desired to be cleared.

At the step SP4, an exposure key is depressed. Upon the depression of the exposure key Ky10 (FIG. 5), the exposure operation starts. Starting from the depression of the exposure key Ky10, the retrieval codes which have been inputed are transferred to RAM 21 (FIG. 5) and then stored therein at the step SP5. Simultaneously therewith, the exposure code is stored. Assuming that the memory area m' for the storage of the exposure code is allocated one bit for each address location, one bit for a particular address location is defined as a logic "1". This signal can be stored, for example, by depressing the exposure key Ky10 to generate a high level signal (H) and then transferring the high level signal to the memory area m' as a write-in data. Where the related frame has not yet been exposed to the image-wise light, the memory area m'n (n=1, 2, ... 999 and 1000) is maintained at a logic "0".

At the subsequent step SP6, the frame which has been exposed to the image-wise light at the electrocharging and exposure chamber is developed, dried and fixed to form a visible image thereon. In other words, the exposed frame is subjected to liquid development within a developing chamber and is then transferred to a fixing chamber through a drying chamber. After the development has been done, the flow returns to the initial step SP1. Where a plurality of frames are consecutively exposed, the flow subsequent to the step SP1 is repeated.

On the other hand, if no exposure is intended and a job other than the exposure is desired to be performed, the step SP2 proceeds to the step SP7. The step SP7 is performed when any one of the address search, the setting in the projector mode and the ending procedure is initiated. The address search can be initiated by depressing an address search key Ky11, the projector mode can be established by depressing a projector mode key Ky12, and the ending procedure wherein the contents stored in RAM 21 are recorded on the length of magnetic recording tape can be initiated by depressing an ending key Ky13. After any one of the foregoing jobs has been chosen, the step proceeds to the step SP8 at which the frame which has not yet been fixed is subjected to a fixing process, and, thereafter, at the step SP9, the process procedures associated with any one of the jobs are executed. A start signal may be the one which is generated upon the detection of the loading of the cassette.

In the foregoing description, it has been described that all of the frames are allocated respective retrieval codes which are stored in the storage means. However, in the practice of the present invention, the retrieval codes are not essential and therefore may not be used. The storage means may be of a type capable of storing the exposure code which is utilized to determine if a frame corresponding to a particular address location has been exposed. However, the use of the retrieval codes is convenient to the operator in that one of the frames which the operator desires to review can readily and quickly be located. Therefore, where the retrieval codes are used, they may be employed one for each address location or, alternatively, they may be employed one for each group of the image information. In the latter case, the storage means may have a relatively small storage capacity.

Figure 9:
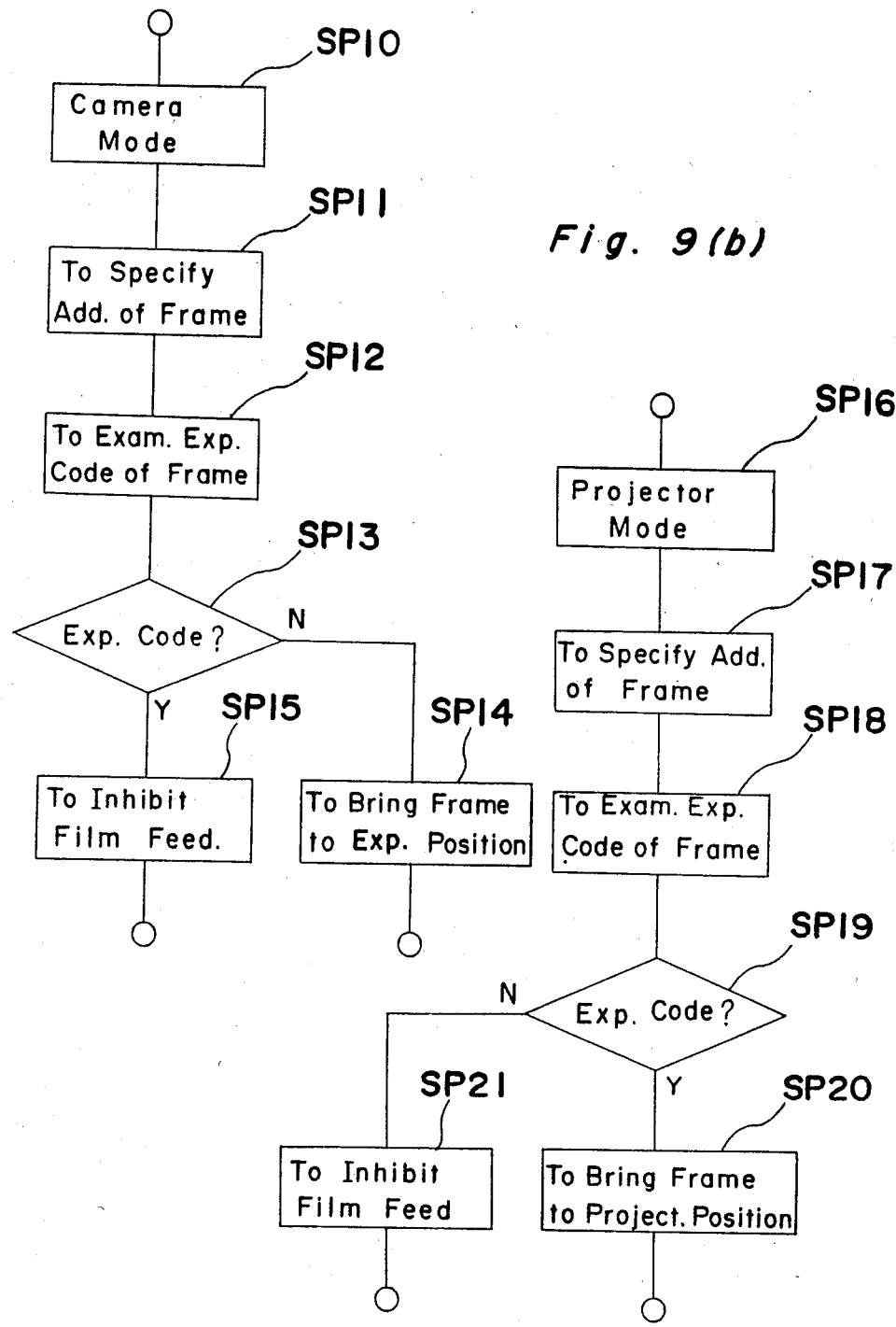
FIGS. 9($a$) and 9($b$) are flow charts showing the sequence of operation of the apparatus in the camera mode and a projector mode, respectively, which takes place depending on the presence and absence of an exposure code.

The operation of the apparatus under any one of the camera and projector modes will now be described with reference to FIG. 9. Referring first to FIG. 9(a), assuming that the apparatus is set to operate under the camera mode at the step SP10, the address of one of the frames which is to be retrieved is specified at the step SP11. When the address is so specified, the content stored in RAM 21 is read out and data stored in the memory area for the exposure codes are examined at the step SP12. At the step SP13, a decision is made as to the presence and absence of the exposure code and, if the result of the decision indicates the absence of the exposure code, the is fed at the step SP14 until one of the frames specified is brought in alignment with the exposure position (the charging and exposure chamber). On the other hand, if the result of the decision at the step SP13 indicates the presence of the exposure code, the film feed is inhibited at the step SP15. By way of example, an error display lamp or the like lamp is lit. In this way, the double exposure of one particular frame can be avoided.

Referring now to FIG. 9(b), assuming that the apparatus is set to operate under the projector mode at the step SP16, the address of one of the frames which is to be retrieved is specified at the step SP17 and, at the subsequent step SP18, the exposure code of such one of the frames is examined. If the result of a decision at the step SP19 indicates the presence of the exposure code, the step SP20 takes place at which the film is fed until the frame corresponding to the specified address is brought into alignment with the projecting position. Substantially simultaneously with the alignment of the particular frame with the projecting position, a control system starts its operation for projecting the image on the particular frame onto the screen.

On the other hand, if the result of the decision at the step SP19 indicates the absence of the exposure code, the film feed is inhibited at the step SP21. An error display lamp is then lit, indicating to the operator that the particular frame has not yet been exposed. In this way, since the film feed is inhibited upon the automatic detection of the absence of the exposure code, the possibility that any unexposed frame may be erroneously illuminated by light emitted from the projector lamp can be avoided. In addition, since if a command to retrieve is inputed in this way, the adequacy of the frame to be retrieved can be immediately determined by the scanning operation of RAM and it can also be determined whether or not the film feed should be initiated, the time required to perform the retrieval can advantageously be reduced.

Figure 10:
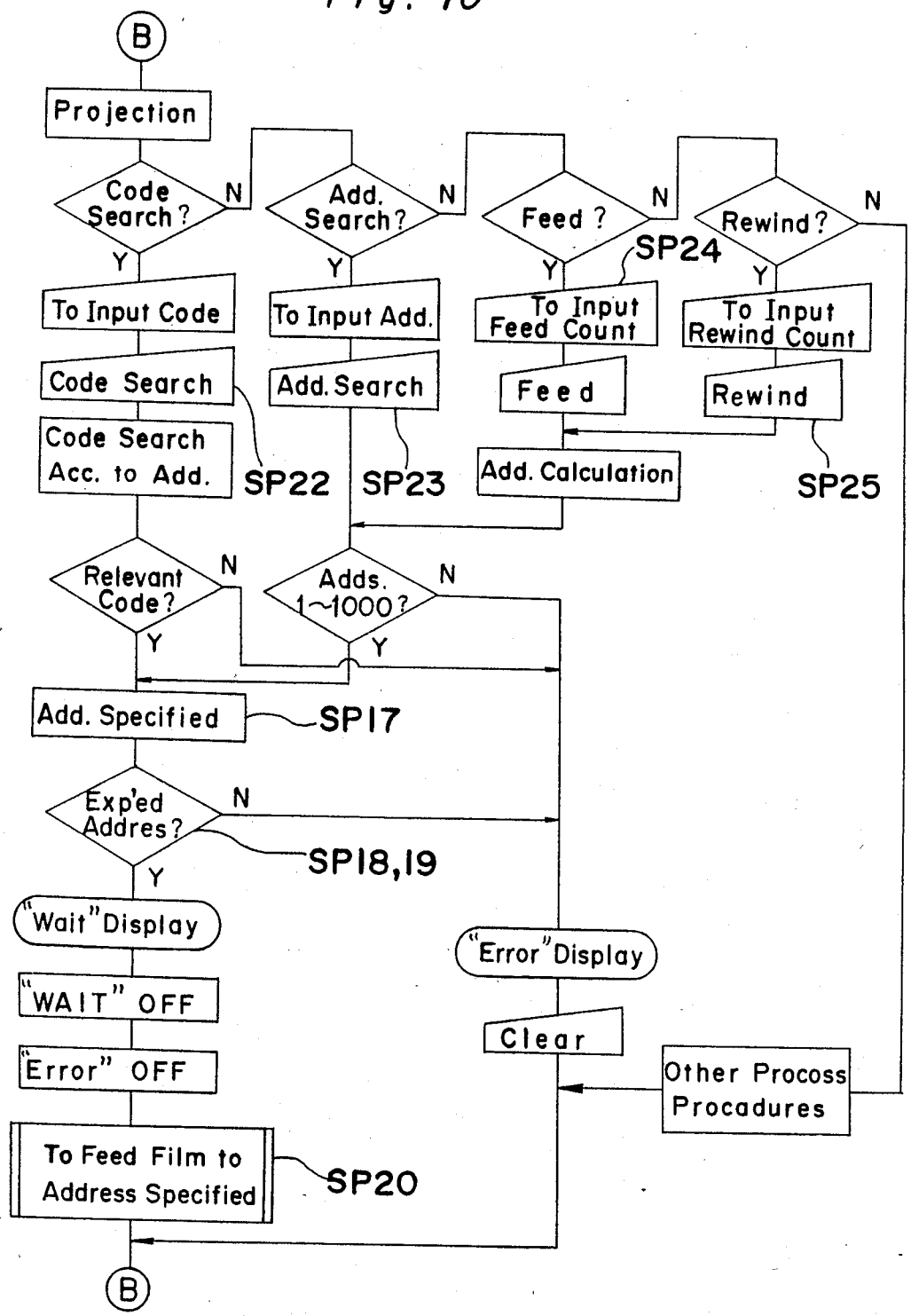
FIG. 10 is a flow chart showing the details of the flow chart of FIG. 9($b$)

The details of the flow chart of FIG. 9(b) are shown in FIG. 10 wherein the same step numbers as used in the flow chart of FIG. 9(b) are used to designate the same steps as in FIG. 9(b). As can be understood from FIG. 10, the retrieval (search) includes four types, i.e., code search, address search, film feed based on the film feed count inputed, and the film rewinding based on the film rewinding count inputed, which can be selectively executed one at a time. It is to be noted that the code search at the step SP22 and the address search at the step SP23 can be performed by depressing a code search key Ky14 (FIG. 5) and an address search key Ky11, respectively. In the case of the film feed and the film rewinding, the number of frames desired to be advanced and the number of frame desired to be rewound can be entered by manipulating one or more of the numerical keys Ky5, and the subsequent manipulation of a feed key Ky15 and a rewind key Ky16 initiates a respective address calculation to identify the address of the film to be retrieved.

Apart from the above, U.S. Pat. No. 3,873,213 discloses a system wherein, simultaneously with the recording of image information on any one of the frames, an exposure marking indicative of such any one of the frames having been exposed is recorded at a location aligned with such any one of the frames. According to this patent, when one of the frames is brought to an exposure position, an optical detector detects the presence or absence of the exposure marking and generates, in the event that it has detected the presence of the exposure marking, a signal which is used to inhibit the exposure of such one of the frames to the image-wise light thereby avoiding the double exposure.

In the system disclosed in this patent, however, the exposure marking must be recorded at a location on the film which is aligned with one of the frames then exposed, and accordingly, unless the film is fed to bring any one of the frames to the exposure position, no one can ascertain whether or not such any one of the frames has been exposed. Therefore, with the system of this patent, not only is the time required to retrieve a particular one of the frames relatively great, but also the film is susceptible to damage.

On the contrary thereto, in the present invention, since the exposure code is stored in a memory such as the length of magnetic recording tape, and since it can be quickly determined, within a time corresponding to the time required to read out from the memory, whether or not the image information has been recorded on a desired frame, not only can the time required to retrieve such desired frame be reduced, but the possibility of the film being damaged can also be minimized. In addition, by counting the number of the exposure codes recorded, the operator can readily ascertain the number of frames having been exposed.

Unless the time required to retrieve the desired frame to a predetermined position is a serious problem in terms of the present invention, the apparatus may employ a discriminating means for determining whether or not the image information has been exposed on a desired one of the frames, while the exposure codes are stored in the memory. Where the discriminating means is employed, it is possible to make a decision as to whether or not the image information has been exposed on the desired one of the frames, when such desired frame is brought to the exposure position and, if the image information is found to have been exposed thereon, the exposure of a different image thereon is inhibited, but when such desired frame is brought to the projecting position and if no image information has not yet been recorded thereon, illumination of such desired frame by means of the projector lamp is inhibited.

The employment of the above described discriminating means in the apparatus of the present invention is advantageous in that no exposure marking is required to be formed on the film in the vicinity of the frame or frames exposed and, accordingly, not only can the film have a relatively great latitude of freedom, but also no detector for detecting the exposure markings is required. Moreover, the apparatus is free from the problem wherein, where the detector is employed for the detecting the exposure marking, the detector may fail to detect it in the event that the exposure marking is illegible because of variation in density developed.

In order to accomplish the above described possibility, the apparatus described with reference to and shown in FIGS. 1 to 5, the microfilm described with reference to and shown in FIG. 6, and the storage means described with reference to and shown in FIG. 8 can be employed with no modification effected thereto, it being, however, that the sequence of operation differs from that shown in FIGS. 9(a) and 9(b) and will now be described with reference to FIGS. 11(a) and 11(b).

Figure 11A:
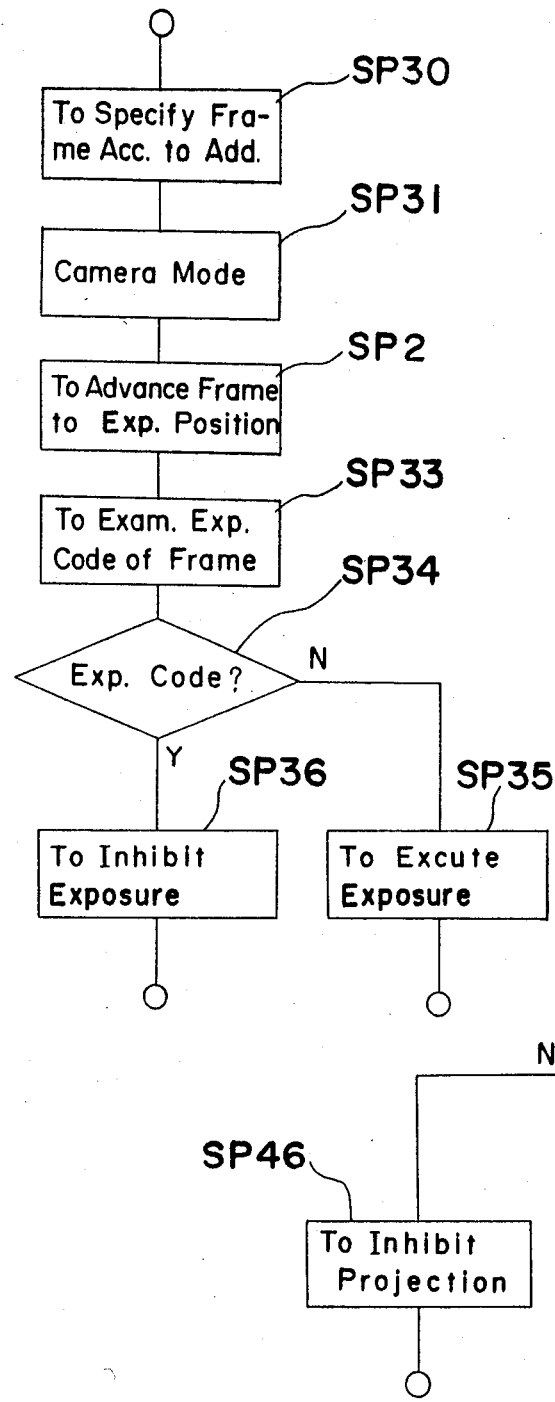
FIGS. 11($a$) and 11($b$) are flow charts similar to FIGS. 9($a$) and 9($b$), respectively, showing the sequence of operation according to another embodiment of the present invention.

Referring first to FIG. 11(a), the address corresponding to a desired one of the frames is specified at the step SP30, and when the apparatus is set to operate under the camera mode at the step SP31, the desired frame is brought to the exposure position at the step SP32. At the subsequent step SP33, the exposure code of such desired frame is read out and, then, a decision is made at the step SP34 to determine the presence or absence of the exposure code. If the result of the decision at the step SP34 indicates the absence of the exposure code, an image of the original is exposed on the desired frame at the step SP35, but if it indicates the presence of the exposure code, the exposure of the image on the desired frame is inhibited at the step SP36.

Figure 11B:
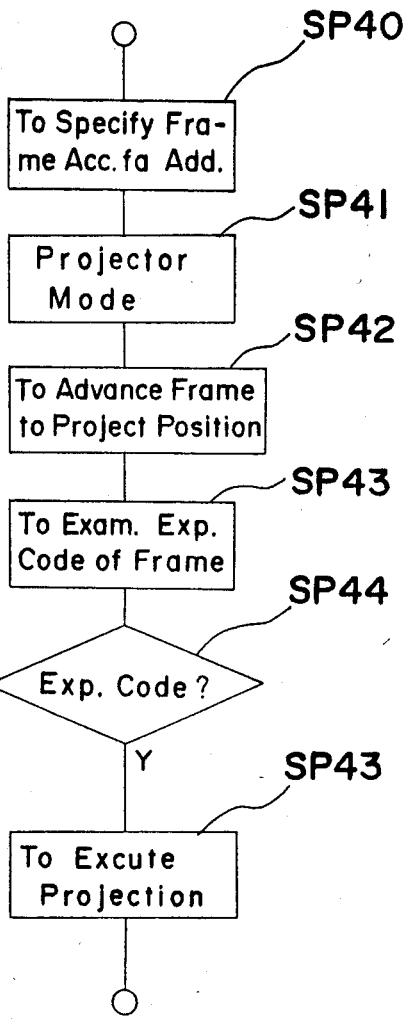

Referring now to FIG. 11(b), at the step SP40, the address corresponding to a desired one of the frames is specified and, when at the step SP41 the apparatus is set to operate under the projector mode, the desired frame is brought to the projecting position at the step SP42. At the subsequent step SP43, the exposure code of such desired frame is read out and, then, a decision is made at the step SP44 to determine the presence or absence of the exposure code. If the result of the decision at the step SP34 indicates the presence of the exposure code, the light from the projector lamp is projected on the image born by such desired frame at the step SP45, but if it indicates the presence of the exposure code, the projection of the image on the desired frame in inhibited at the step SP46 and, at the same time, an error display may be effected.

From the foregoing, it has now become clear that the present invention is effective to avoid the double exposure on one frame and also to avoid the exhaustion of the film resulting from the exposure to unnecessary light. Moreover, where the operator wishes to know the number of frames having not yet been exposed, it can readily be accomplished by counting the number of exposure codes.

Although the present invention has fully been described in connection with the preferred embodiments thereof with reference to the accompanying drawings, it is to be noted that various changes and modifications are apparent to those skilled in the art. Unless such changes and modifications departs from the scope of the present invention as defined by the appended claims, they should be understood as included therein.

We claim:

1. A combined camera and viewer comprising a self-contained apparatus capable of operating selectively under camera and projector modes, one mode at a time, said apparatus, when under the camera mode, being operable to expose image information on a photosensitive film having a plurality of frames, and said apparatus, when under the projector mode, being operabe to project onto a screen an image recorded on the photosensitive film, said apparatus comprising:
   a film transporting means for transporting the film to bring any one of the frames selectively to one of frame exposing and frame projecting positions;
   means for detecting whether or not any one of the frames has been brought to one of said exposing and projecting positions; and
   means for discriminating whether or not an image has been recorded on said any one of the frames, means, when the apparatus is set to operate under the camera mode, responsive to said discriminating means determining whether or not the image information has been recorded on such one of the frames, for inhibiting such one of the frames, if having the image information recorded thereon, from being brought to the exposing position, and means, when the apparatus is set to operate under the projector mode, responsive to said discriminating means determining whether or not the image information has been recorded on such one of the frames for inhibiting said one frame if the image information has not yet been recorded thereon, from being brought to the projecting position.

2. An apparatus as claimed in claim 1, wherein said photosensitive film is an electrophotographic film.

3. An apparatus as claimed in claim 1, wherein said photosensitive film is a film having a silver halide emulsion layer.

4. An apparatus as claimed in claim 1, wherein said photosensitive film is an electrographic migration imaging film.

5. An apparatus as claimed in claim 1, wherein said photographic film has a row of blip markings formed thereon, and wherein said detecting means comprises means for photoelectrically detecting any one of the blip markings.

6. An apparatus as claimed in claim 1, wherein said film transporting means comprises a drive mechanism driving one of two reels accommodated in a cassette and around which the film is wound.

7. An apparatus as claimed in claim 1, wherein said discriminating means comprises a memory for storing an exposure code for each frame, said exposure code being indicative of the respective frame having been occupied by the image information recorded thereon, a write-in means operatively associated with the exposing for writing in said exposure code in the memory at a location corresponding to the frame on which the image information has been recorded, and a read-out means for reading out said exposure code from the memory.

8. An apparatus as claimed in claim 7, wherein said memroy comprises a semiconductor memory.

9. An apparatus as claimed in claim 7, wherein said memory comprises a semiconductor and a magnetic tape memory which can be interchanged with each other if necessary.

10. An apparatus as claimed in claim 1, wherein said exposing and projecting positions are located at the same position.

11. A combined camera and viewer comprising a self-contained apparatus capable of exposing image information on a photosensitive film having a plurality of frames and also projecting image information, recorded on any one of the frames, onto a screen one at a time,
   said apparatus comprising:
   a film transporting means for transporting the film to bring any one of the frames to one of frame exposing and frame projecting positions;
   means for detecting whether or not any one of the frames has been brought to said one of the frame exposing and frame projecting positions; and
   means for discriminating whether or not an image has been recorded on said one of the frames, means, when said detecting means detects that one of the frames has been brought to the exposing position, responsive to said discriminating means determining whether or not the image information is recorded on said one frame and, in the event that the image information is recorded on said one frame, for inhibiting said one frame from being recorded with the image information, and means, when said detecting means detects that one of the frames has been brought to the projecting position, responsive to said discriminating means determining whether or not the image information is recorded on any one of the frames and, in the event that the image information has not yet been recorded on said one of the frames, for inhibiting said one frame from being illuminated by light used to project the image information on the screen.

* * * * *